Dec. 24, 1968  J. T. SCHUPLIN  3,417,438
DEFORMABLE POLYMERIC FASTENING DEVICE
Filed May 14, 1965  2 Sheets-Sheet 1

INVENTOR.
JEROME T. SCHUPLIN
BY
Jeane, Fretzer & Jeane
ATTORNEYS

Dec. 24, 1968          J. T. SCHUPLIN          3,417,438
DEFORMABLE POLYMERIC FASTENING DEVICE
Filed May 14, 1965                    2 Sheets-Sheet 2
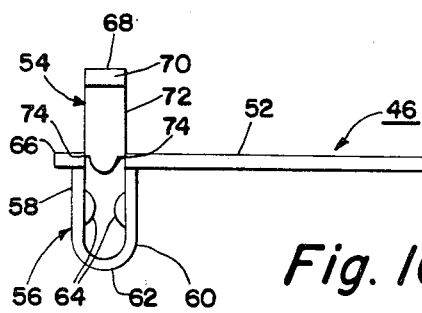
Fig. 10
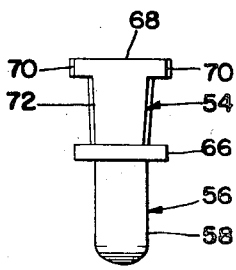
Fig. 11
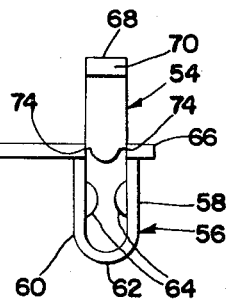
Fig. 12
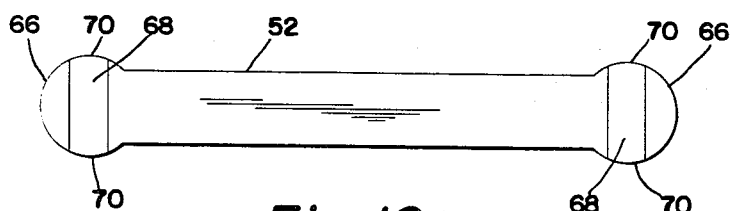
Fig. 13
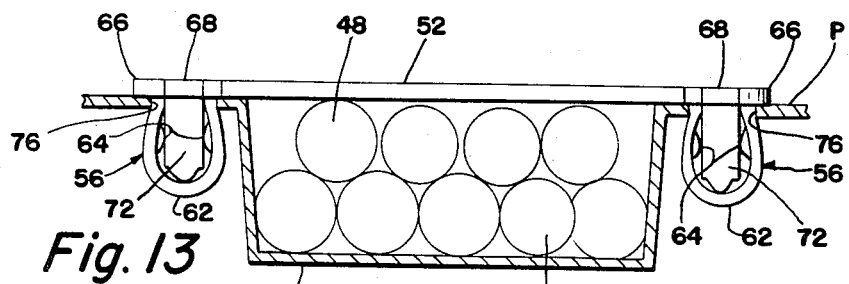
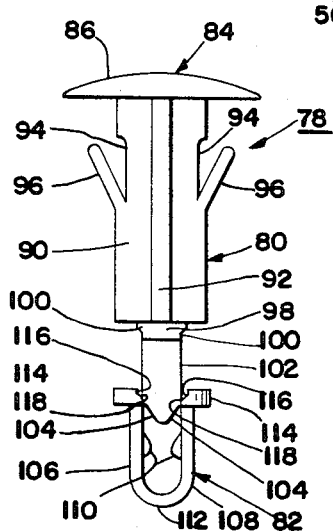
Fig. 14
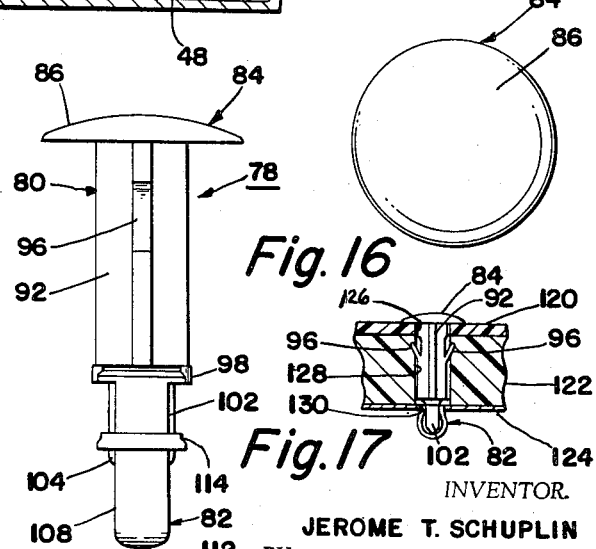
Fig. 15    Fig. 16    Fig. 17
INVENTOR.
JEROME T. SCHUPLIN
BY
ATTORNEYS United States Patent Office 3,417,438
Patented Dec. 24, 1968

3,417,438
DEFORMABLE POLYMERIC FASTENING DEVICE
Jerome T. Schuplin, Parma Heights, Ohio, assignor to Tinnerman Products, Inc., a corporation of Ohio
Filed May 14, 1965, Ser. No. 455,786
18 Claims. (Cl. 24—73)

ABSTRACT OF THE DISCLOSURE

A fastening device made from polymeric material comprising a loop-like generally vertically oriented body, a drive pin initially made integral with the body along a limited area adapted to be sheared therefrom and moved downwardly into the body upon application of pressure thereto, and a pair of spaced, oppositely disposed cam elements projecting inwardly from the body adapted for camming engagement by the drive pin to cause spreading deformation of the body upon the application of said pressure to the drive pin.

---

The present invention relates to fastener devices, and more particularly relates to an improved unitary, one-piece fastener device comprised of polymeric material which is readily adapted for front mounting on an apertured work structure and/or for mounting objects, such as cable, wire, molding clips, capacitor mounts and the like, to an apertured work structure.

Heretofore, various fastener devices of the rivet type have been employed for mounting sheets of material together or for use as insulating bushings, bearings or the like. Such heretofore known devices, however, have not provided satisfactory structural and functional characteristics to facilitate quick and economic installation, nor have such devices provided permanent stability in the securement of one or more component parts together, particularly in installations wherein a maximum pull-out resistance is required for maintaining a permanent securement. Furthermore, such heretofore known devices are generally of a multi-part construction which substantially increases their unit cost even when using mass production techniques of fabrication.

Accordingly, an object of the present invention is to provide an improved construction for a fastener device comprised of a polymeric material which is of a unitary, one-piece construction for mounting on an apertured work structure and/or for mounting an object to an apertured work structure.

Another object of the present invention is to provide a fastener device of the character described which is of a simple, yet rugged, economic construction and which may be quickly and easily assembled and disassembled with a minimum of time and effort.

Another object of the present invention is to provide a fastener of the character described which may readily be applied in blind or inaccessible locations and which because of its improved structural and functional characteristics provides optimum pull-out resistance in the mounted secured position thereof.

Further objects and advantages of the invention will be apparent from the following description taken in conjunction with the accompanying drawings, wherein:

FIG. 10 is a front elevational view showing another modification of the fastener device made in accordance with the present invention;

FIG. 11 is a side elevational view looking from the righthand side of the fastener device of FIG. 10;

FIG. 12 is a top plan view of the fastener device of FIG. 10;

FIG. 13 is a fragmentary front elevational view partly in section showing the fastener device of FIGS. 10 to 12 for securing cable or wire within the trough of a work structure, such as a panel;

FIG. 14 is a front elevational view of another modification of the fastener device made in accordance with the present invention;

FIG. 15 is a side elevational view looking from the righthand side of the fastener device of FIG. 14;

FIG. 16 is a top plan view of the fastener device of FIGS. 14 and 15; and

FIG. 17 is a fragmentary front elevational view on a reduced scale and partly in section showing the modification of the fastening device of FIGS. 14 to 16 for securing a liner to a support structure, such as a dash panel.

Figure 1:
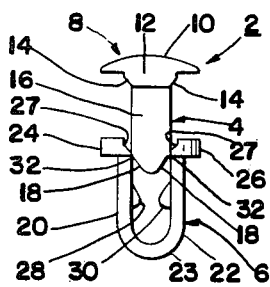
FIG. 1 is a front elevational view of the fastener device made in accordance with the present invention.
Figure 2:
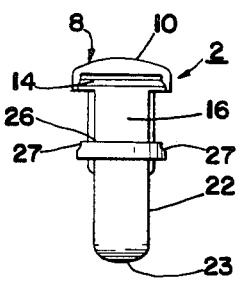
FIG. 2 is a side elevational view looking from the righthand side of the fastener device of FIG. 1.
Figure 3:
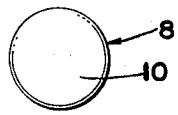
FIG. 3 is a top plan view of the fastener device of FIGS. 1 and 2.

Referring then more particularly to the drawings wherein like parts are designated by like reference numerals throughout the drawings, the fastener device, designated generally at 2, embodying one form of the present invention is shown in FIGS. 1 to 5. The device 2 is preferably formed as a unitary, one-piece construction, such as by molding or other such forming techniques, as are known in the art. As shown, the device 2 includes a generally T-shaped drive pin 4 which is adapted to be inserted axially into a generally vertically oriented, loop-like body 6.

The drive pin 4 is shown as including a circular head 8 (FIG. 3) having a generally convex upper surface 10. The head 8, however, may be of any size or shape for a given application, as desired. From the head 8 depends an integral stem 12 chamfered at its opposed marginal edges, as 14, so as to tightly seat within the loop-like body 6. An elongated shank 16 extends axially downwardly from the stem 12 and is preferably tapered adjacent its free end, as at 18, to facilitate insertion into the loop-like body 6. The shank 16 may be of any suitable polygonal configuration, such as square, rectangular, or the like; or the shank may be of any circular or non-circular configuration, as desired.

The loop-like body 6 which initially integrally mounts the drive pin 4 comprises a pair of oppositely disposed, generally vertically extending flexible legs 20 and 22 connected together adjacent one end by a curved bight portion 23 to provide the generally U-shaped configuration shown. The legs 20 and 22 are each provided adjacent their upper ends with integral flanges 24 and 26 which project laterally outwardly therefrom and which are adapted for engagement with the confronting side of a work structure. Preferably, the flanges 24 and 26 are recessed, as at 27, so as to seat therein the chamfered stem 12 of the drive pin 4. The legs 20 and 22 are further provided on their interior surface with spaced, oppositely disposed cam-like ribs 28 and 30 which project inwardly toward one another by an amount sufficient to provide a predetermined lateral spreading action of the legs 20 and 22 upon insertion of the drive pin 4 therethrough, as will hereinafter be more fully described.

Prior to installation, the drive pin 4 is initially integrally connected, such as by molding or the like, to the loop-like body 6 along opposed marginal surfaces as at 32. This connection of the drive pin 4 to the body 6 provides a juncture of reduced or limited area which enables the drive pin 4 to be readily sheared therefrom upon application of pressure to the head 8. The transverse cross-sectional dimension of the shank 16 is preferably substantially the same size as or slightly smaller than the interior transverse distance between the legs 20 and 22 to provide a tight, yet slidable coacting fit therebetween. The distance between the cam-like ribs 28 and 30, however, is preferably substantially less than the transverse dimension of the shank 16 so as to cause a lateral spreading deformation of the legs 20 and 22 upon insertion of the shank 16 into camming coacting engagement with the ribs 28 and 30. In this form and prior to installation, the longitudinal dimension of the shank 16 is preferably slightly less than that of the loop-like body 6 so that in the final installed and deformed position of the device, the shank 16 is firmly bottomed in engagement against the bight portion 23 of the body 6.

Figure 4:
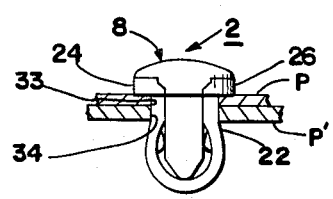
FIG. 4 is a fragmentary front elevational view partly in section showing a modification of the fastener device for mounting two work structures, such as panels, in superimposed relationship.

Conveniently, the device 2 may be readily employed for use with any suitable work structure, such as for mounting apertured panels P and P' together in superimposed relationship, as shown in FIG. 4. In application, the loop-like body 6 is simply inserted through the aligned apertures 33 and 34 in the respective panels until the laterally projecting flanges 24 and 26 are brought into engagement with the confronting upper side of the panel P which limits further axial movement of the device. Pressure may then be applied to the head 8, such as by striking with a suitable tool, in an amount sufficient to shear the drive pin 4 from its integral juncture 32 with the loop-like body 6. After being sheared, the drive pin 4 moves axially downwardly between the flexible legs 20 and 22 and into camming engagement with the cam-like ribs 28 and 30. Such camming action causes a lateral spreading deformation of the legs 20 and 22 in the final bottomed position of the drive pin 4 against the bight portion 23. In this installed and deformed position, the originally generally U-shaped body 6 assumes a generally oblate configuration so that the exterior side surfaces of the legs 20 and 22 are brought into tight engagement with the confronting under side of the panel P' adjacent the opening 34 therein for locking respective panels firmly together in superimposed relationship. To remove the device, the drive pin 4 is simply pried up with a suitable tool, such as a thin blade, until it is pulled free. The loop-like body 6 may then be simply compressed by applying inward pressure to the laterally projecting flanges 24 and 26 whereupon it can be withdrawn for storage or reuse.

In the present invention, it is important to note that the loop-like body 6 provides a rivet-like expander upon insertion of the drive pin 4 into engagement with the cam-like ribs 28 and 30. Thus because the flexible legs 20 and 22 are integrally connected together by the bight portion 23, the U-shaped body 6 defined thereby is uniformly deformed so as to assume a generally oblate configuration for exerting a maximum securing engagement with the confronting side of the work structure. Such combined drive pin and loop-like expander arrangement accommodates a wide range of aperture and/or panel sizes and incorporates by its construction an average pull-out resistance of 100 pounds.

Figure 5:
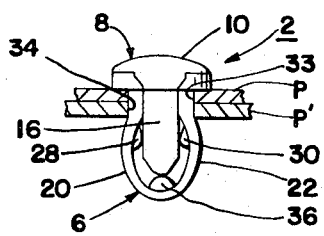
FIG. 5 is a front elevational view partly in section showing a modification of the fastener device for mounting two work structures such as panels in superimposed relationship.

In FIG. 5 there is shown a modification of the fastener device 2 which is generally identical to that described in FIGS. 1 to 4 except that a generally semi-circular lug 36 is provided to extend upwardly from the interior surface of the bight portion 23. This lug 36 acts as an abutment for limiting axial movement of the drive pin 4 in its final bottomed position and strengthens the loop-like body 6 in that area. In addition, the lug 36 serves as a contact point for an ejector pin during fabrication and removal of the device from the mold during forming thereof.

Figure 6:
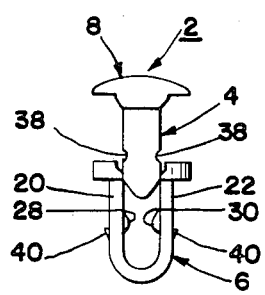
FIG. 6 is a front elevational view of a modification of the fastener device made in accordance with the present invention.
Figure 7:
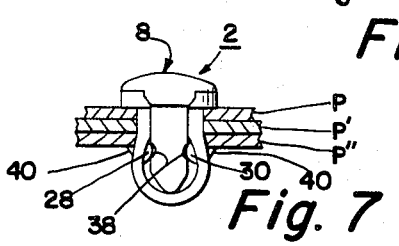
FIG. 7 is a front elevational view partly in section showing the fastener device of FIG. 6 as applied for mounting three work structures, such as panels, in superimposed relationship.

In FIGS. 6 and 7 there is shown another modification of the fastener device 2 which is generally identical to that described in FIGS. 1 to 5, except that the drive pin 4 is provided substantially adjacent its mid-portion with oppositely disposed grooves 38 which are adapted for interlocking coacting registration with the cam-like ribs 28 and 30 provided on the flexible legs 20 and 22. By this arrangement, there is provided a greater locking action on the drive pin 4 by the loop-like body 6 in applications where such additional locking action is required. In this form, the device is further provided with tabs 40 which project outwardly from the exterior side surfaces of the legs 20 and 22, respectively. The tabs 40 are preferably disposed adjacent and immediately below the ribs 28 and 30 so as to be readily adapted for locking engagement against the confronting under side surface of the panel P'', as shown in FIG. 7. By this arrangement, the loop-like body 6 is given a self-retaining construction in cases where the drive pin 4 is removed or in cases prior to the drive pin 4 being inserted into the loop-like body 6.

Figure 8:
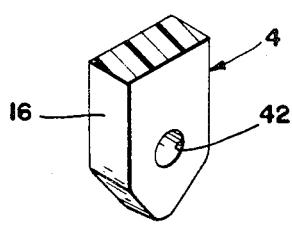
FIG. 8 is a fragmentary perspective view showing a modification of the drive pin member of the fastener device made in accordance with the present invention.
Figure 9:
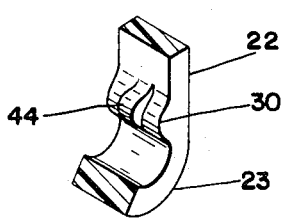
FIG. 9 is a fragmentary perspective view showing a modification of a portion of the loop-like body of the fastener device made in accordance with the present invention.

In FIGS. 8 and 9, there is shown a modification of the arrangement for interlocking the drive pin 4 within the loop-like body 6 of the device 2. In this arrangement, the shank 16 of the drive pin 4 is preferably provided with an aperture 42 disposed adjacent one end thereof which is adapted to receive therein a detent portion 44 provided on each of the cam-like ribs, such as on the rib 30 shown in FIG. 9. As shown, the detent portion 44 is disposed generally at the mid-portion of the rib 30 and projects outwardly therefrom by an amount sufficient to project into the aperture 42 provided in the drive pin 4 so as to achieve a positive locking registration of the drive pin 4 within the loop-like body 6. Though the drive pin 4 in the embodiment shown is provided with an aperture, it is to be noted that the drive pin may be provided with grooved or recessed portions to accomplish equally beneficial results.

In FIGS. 10 to 13, there is shown another modification in the form of a twin-type fastener device, designated generally at 46, which is particularly useful in mounting cable or wire 48 (FIG. 13) within the trough 50 of a work structure, such as a panel P. In this form, the twin-type fastener comprises a pair of oppositely disposed twin fastener devices interconnected by an elongate flexible strap 52. The twin fastener devices are generally similar in construction as those shown in FIGS. 1 to 4, each including a generally T-shaped drive pin 54 initially integrally mounted on a loop-like body 56, having generally vertically extending flexible legs 58 and 60 interconnected by a bight portion 62. The legs 58 and 60 similarly include inwardly projecting cam-like ribs 64 for camming coacting engagement with the drive pin 54 upon insertion of the same into the loop-like body 56. In this form, however, the outer resilient leg 58 of each device is provided with an outwardly projecting generally semi-circular flange 66 (FIG. 12) while the inner resilient leg 60 is integrally connected, such as by molding or the like, to one of the opposed ends of the aforementioned flexible strap 52.

In the embodiment shown, the drive pin 54 of each device includes a generally polygonal, such as rectangular, shaped head 68 having rounded end portions 70 so as to smoothly correspond in contour to the semi-circular flanges 66 provided on the respective loop-like body 56 in the final installed position of the device. A tapered, in side elevation FIG. 11, shank 72 depends downwardly from the head 68 and is initially made integral at the juncture with the loop-like body 56, at shear points 74, for the purposes as above described.

In application of this form, cable or wire 48 may be simply placed in the trough 50 of the panel and the loop-like body 56 of each device disposed through the respective spaced apertures 76 provided in the panel P. Thus inserted, the flexible strap 52 bridges across the open top of the trough 50, thereby to retain the cable or wire therein. Pressure may then be applied to the head 68 of each drive pin 54 to shear the drive pin from its juncture 74 with the loop-like body 56 and to force the shank 72 downwardly into camming coacting engagement with the ribs 64 provided on the respective flexible legs 58 and 60. Such camming action causes lateral spreading deformation of the loop-like body 56 into a generally prolate configuration so that the outer side surfaces of the legs 58 and 60 are disposed in tight fitting engagement against the confronting under side of the panel P. Thus installed, the flexible strap 52 is effectively disposed to bridge across the open top of the trough for holding the cable or wire firmly in place thereby to positively retain the same in assembled relationship with the panel.

In FIGS. 14 to 17, there is shown another modification of the fastener device, designated generally at 78, which is particularly useful in automotive applications, such as in the mounting of a dash liner. As shown, the device 78 includes a generally T-shaped drive pin 80 initially integrally mounted on a generally loop-like body 82. In the embodiment shown, the drive pin 80 includes a generally circular, in top plan, head 84 having a generally convex upper surface 86. From the head 84 depends an elongated body defined by a pair of generally vertically oriented webs 90 and 92. The webs 90 and 92 may be of a polygonal, such as rectangular, shape, and are integrally connected together at right angles relative to one another to provide a generally cross-shape configuration in cross-section. One of the webs 90 is preferably cut-out adjacent its opposed marginal edges, as at 94, to provide a pair of upwardly and angularly outwardly extending flexible wings 96 adapted to be embedded in a deformable material to which the device may be applied.

From the webs 90 and 92 which define the body of the drive pin 80 depends an axially extending stem 98 chamfered, as at 100, so as to be tightly seated within the loop-like body 82. An elongated polygonal shank 102 depends downwardly from the stem 98 and is tapered adjacent its free end, as at 104, to facilitate insertion into the loop-like body 82, as aforesaid.

The loop-like body 82 is generally similar in construction to that illustrated in FIGS. 1 to 4, and includes a pair of flexible generally vertically extending legs 106 and 108 having interior cam-like ribs 110 and connected together by a bight portion 112. The upper ends of the respective legs 106 and 108 are similarly provided with generally semi-circular flanges 114 which project laterally outwardly therefrom for engagement against the confronting surface of a work structure. The respective flanges 114 are similarly recessed, as at 116, to provide a seat for the stem 98 of the drive pin 80 in the installed position thereof. Here again, drive pin 80 is initially integrally mounted on the loop-like body 82 at shear points 118 adjacent the flanges 114 for the purposes, as aforesaid.

In a typical application of this form and as best shown in FIGS. 17, the device 78 may readily be employed for mounting a liner 120, comprised of polymeric material or the like, to a reinforcement 122, comprised of rubber, foam rubber or the like, which may suitably be mounted on a work structure 124, such as a dash panel. In assembly, the loop-like body 82 is simply inserted through aligned apertures 126, 128 and 130 provided in the liner 120, reinforcement 122 and panel 124, respectively. Pressure may then be applied to the head 84 so as to shear the drive pin 80 from its initial integral mounting on the loop-like body 82. Downward movement of the drive pin 80 into camming coacting engagement with the cam-like ribs 110 causes spreading deformation of the loop-like body 82 so that the flexible legs 106 and 108 are brought into tight fitting engagement against the confronting under side surface of the panel 124. In this form, however, as the drive pin is moved downwardly, the flexible wings 96 projecting from the webs 90 and 92 are biased inwardly to permit free movement thereof through the reinforcement material 122. Once the shank 102 of the drive pin 80 is bottomed on the bight portion 112 of the loop-like body 82, the flexible wings 96, due to the elastic memory of the polymeric material, spring outwardly so as to be tightly embedded within the deformable material of the reinforcement 122 so as to provide a positive interlocking securement thereof with the panel 124. Accordingly, in the installed position of the device, the vertically oriented webs 90 and 92 defining the body of the drive pin 80 are disposed in abutment against the confronting upper side of the panel 124 to provide an effective spacer arrangement for holding the parts together. Moreover, dependent upon the desired longitudinal dimension of the drive pin body, as defined by the webs 90 and 92, the desired optimum force can be achieved for mounting the liner 120 and reinforcement material 122 to the panel 124 without distortion or damage to the liner 120 and without disrupting the smooth outer surface provided by the liner as would otherwise be the case were the drive pin drawn too tightly against the panel 124.

The fastener device in all of the various embodiments illustrated above is preferably made in a unitary, one-piece construction comprised of a polymeric material, such as nylon or the like, which may be readily molded or formed as is known in the art. Being made from a polymeric material, the fastener device of the present invention effectively dampens vibration; acts as an electrical and thermal insulator; has an attractive, low profile head; and can be readily color-matched to provide a wide range of applications. The fastener device of the present invention may be readily employed for use with a wide range of panel and/or aperture sizes and for a wide range of application. Though the fastener device of the present invention has been illustrated for mounting two or more panels together and/or for mounting cable and wire to a panel, it is to be understood that other applications of the fastener device may be employed, such as for mounting molding clips, capacitor mounts, self-retained knobs, drawer glides, feet for desk or table top equipment, and other such similar applications.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention.

I claim:

1. A fastener device comprising, a generally vertically oriented loop-like flexible body member, a drive pin member initially integrally mounted on said body member along a limited area adapted to be sheared therefrom and moved into said body member, cam means projecting inwardly from said body member adapted for engagement by said drive pin member to cause deformation of said body member, said body member being of a generally U-shaped configuration including spaced, oppositely disposed flange portions adjacent one end defining a head for engagement with a confronting side of a support member, said body member including tab means projecting outwardly therefrom for engagement with the other confronting side of said support member, said drive pin member including an elongated body portion having oppositely disposed apertures therein, and said cam means being adapted for interlocking holding engagement within said apertures in the deformed position of said body member.

2. A fastener device in accordance with claim 1, wherein said drive pin member includes a head made integral at one end thereof, and said head of said drive pin member is adapted to be seated intermediate the flange portions of said loop-like body member in the deformed position of said loop-like body member.

3. A fastener device in accordance with claim 1, wherein said loop-like body member is defined by a pair of spaced, generally vertically extending flexible legs interconnected together adjacent one end by a bight portion, and lug means projects upwardly from said bight portion intermediate said legs to limit movement of said drive pin member.

4. A fastener device in accordance with claim 1, wherein said drive pin member includes a head and an elongated, polygonal shaped body extending downwardly from said head, a shank depending axially downwardly from said polygonal body, and a pair of oppositely disposed flexible wings projecting angularly outwardly from said polygonal body adapted for yieldably interlocking holding engagement with a deformable work structure.

5. A fastener comprising a pair of fastener devices each of which is formed of the combination of elements recited in claim 1, in which the loop-like body member includes a pair of spaced flexible legs interconnected at one end by a bight portion to form said U-shaped configuration, said pair of body members being connected together by an elongate flexible strap, said strap being connected at its opposed ends to the associated adjacent legs of the respective body members to provide a unitary, one-piece structure.

6. A fastener device comprising, a generally vertically oriented loop-like body member, a drive pin member initially integrally mounted on said body member along a limited area adapted to be sheared therefrom and moved into said body member, cam means projecting inwardly from said body member adapted for engagement by said drive pin member to cause deformation of said body member, said body member being of a generally U-shaped configuration including spaced, oppositely disposed flange portions adjacent one end defining a head for engagement with a confronting side of a support member, said body member including tab means projecting outwardly therefrom for engagement with the other confronting side of said support member, said drive pin member including an elongated polygonal shank depending downwardly from said head and having oppositely disposed groove means on the external surface thereof, and said cam means being adapted for interlocking holding engagement within said groove means in the deformed position of said body member.

7. A fastener device comprising, a generally vertically oriented loop-like body member, a drive pin member initially integrally mounted on said body member along a limited area adapted to be sheared therefrom and moved into said body member, cam means projecting inwardly from said body member adapted for engagement with said drive pin member to cause deformation of said body member, said body member being of a generally U-shaped configuration including spaced, oppositely disposed flange portions adjacent one end defining a head for engagement with a confronting side of a support member, said body member including tab means projecting outwardly therefrom for engagement with the other confronting side of said support member, said drive pin member including an elongated polygonal shaped shank depending downwardly from said head and having an aperture on oppositely disposed sides thereof, and said cam means includes a pair of spaced, oppositely disposed transversely extending ribs made integral with said body, each of said ribs including an outwardly projecting detent portion for interlocking holding engagement within one of the associated apertures in said shank to prevent withdrawal of said drive pin member in the deformed position of said body member.

8. A unitary, one-piece fastener device made from polymeric material comprising, a generally vertically oriented loop-like body and a drive pin member initially made integral with said loop-like body, said drive pin member including a head and an elongated, generally polygonal shaped body depending downwardly from said head adapted for engagement with said loop-like body in the final installed position of said device, a pair of flexible wings projecting outwardly and angularly upwardly from opposed sides of said polygonal body adapted for interlocking gripping engagement with a deformable work material, a shank depending downwardly from said polygonal body and connected along a limited area to said loop-like body adapted to be sheared therefrom and moved downwardly into said loop-like body upon application of pressure to said head, and a pair of oppositely disposed cam-like ribs projecting inwardly from said loop-like body adapted for engagement by said shank to cause spreading deformation of said loop-like body.

9. A fastener device in accordance with claim 8, wherein the polygonal body of said drive pin member includes a pair of generally vertically oriented webs disposed at an angle with respect to one another, and wherein said wings are formed out of the material of at least an opposed pair of said webs.

10. A fastener device in accordance with claim 8, including, in combination, a pair of body members having the form of said loop-like body member connected together in laterally spaced relation by an elongated flexible strap, each of said body members including a pair of spaced, generally vertically extending flexible legs interconnected together at one end by a bight portion, and said strap being connected at its opposed ends to the associated adjacent legs of the respective body members to provide a unitary, one-piece structure.

11. A fastener device in accordance with claim 8, wherein said loop-like body is of a generally U-shaped configuration including a pair of spaced, oppositely disposed flange portions defining a head for said loop-like body for engagement with a confronting side of a support member, and said shank includes a stem portion disposed adjacent its juncture with said loop-like body adapted to be seated between said flange portions in the deformed position of said loop-like body.

12. A fastener device in accordance with claim 8, wherein said shank includes a taper at the end remote from the drive pin member head with the transverse distance between said ribs less than the transverse dimension of said shank.

13. A fastener device made from a polymeric material for mounting on an apertured support member comprising, a generally vertically oriented loop-like body member adapted for insertion through the aperture in said support member, said body member including a pair of spaced, generally vertically extending flexible legs which extend downwardly from a head, the legs being connected together by a curved bight portion to provide a generally closed end remote from said head, a drive pin member initially made integral with the loop-like body member at the end adjacent said head and along a limited area adapted to be sheared therefrom and moved downwardly between said legs upon application of pressure thereto, said drive pin member being tapered at the end adjacent said head, a pair of spaced, oppositely disposed cam-like ribs projecting inwardly from said legs and disposed above said bight portion adapted for camming coacting engagement with the tapered end of said drive pin member, and the transverse dimension of said drive pin member being greater than the transverse distance between said ribs to cause spreading outward deformation of said legs away from one another and into gripping coacting engagement with the confronting marginal edges presented by the aperture in said support member upon downward movement of said drive pin member between said ribs, said drive pin member including an elongated body portion having oppositely disposed apertures therein, and said ribs being adapted for interlocking holding engagement within said apertures in the vertically installed position of said drive pin member.

14. A fastener device in accordance with claim 13, wherein said loop-like body member includes a pair of spaced, oppositely disposed flange portions defining its head for engagement with the confronting side of said support member, and said drive pin includes a head having a stem depending downwardly therefrom adapted to be seated between said flange portions in the vertically installed position of said drive pin.

15. A fastener device in accordance with claim 13, wherein said loop-like body member is of a generally U-shaped configuration, and further includes lug means projecting upwardly from said bight portion between said legs to limit downward movement of said drive pin member.

16. A fastener including a pair of fastener devices each of which is formed of the combination of elements recited in claim 13, the loop-like body members of said fastener being connected together in laterally spaced relationship by an elongate, flexible strap, said strap being attached at its opposed ends in integral relationship with the heads of said loop-like body members to provide a unitary fastener device.

17. A fastener device made from a polymeric material for mounting on an apertured support member comprising, a generally vertically oriented loop-like body member adapted for insertion through the aperture in said support member, said body member including a pair of spaced, generally vertically extending flexible legs which extend downwardly from a head, the legs being connected together by a curved bight portion to provide a generally closed end remote from said head, a drive pin member initially made integral with the loop-like body member at the end adjacent said head and along a limited area adapted to be sheared therefrom and moved downwardly between said legs upon application of pressure thereto, said drive pin member being tapered at the end adjacent said head, a pair of spaced, oppositely disposed cam-like ribs projecting inwardly from said legs and disposed above said bight portion adapted for camming coacting engagement with the tapered end of said drive pin member, and the transverse dimension of said drive pin member being greater than the transverse distance between said ribs to cause spreading outward deformation of said legs away from one another and into gripping coacting engagement with the confronting marginal edges presented by the aperture in said support member upon downward movement of said drive pin member between said ribs, said drive pin member including an elongated shank depending downwardly from a head and having oppositely disposed groove means on the external surface thereof, and said ribs being adapted for interlocking holding engagement within said groove means in the deformed position of said loop-like body.

18. A fastener device made from a polymeric material for mounting on an apertured support member comprising, a generally vertically oriented loop-like body member of U-shaped configuration adapted for insertion through the aperture in said support member, said body member including a pair of spaced, generally vertically extending flexible legs which extend downwardly from said head, the legs being connected together by a curved and resilient bight portion to provide a generally closed end remote from said head, a drive pin member initially made integral with the loop-like body member at the end adjacent said head and along a limited area adapted to be sheared therefrom and moved downwardly between said legs upon application of pressure thereto, said drive pin member being tapered at the end remote from said head, a pair of spaced, oppositely disposed cam-like ribs projecting inwardly from said legs and disposed above said bight portion adapted for camming coacting engagement with the tapered end of said drive pin member, the transverse dimension of the said drive pin member being greater than the transverse distance between said ribs to cause spreading outward deformation of said legs away from one another, said loop-like body member having an oblate configuration when in the deformed position and having said legs disposed in underlying and overlapping engagement with the confronting marginal edges presented by the aperture in said support member upon downward movement of said drive pin member between said ribs, and into engagement with said bight portion, and said bight portion restricting outward deformation of said legs at the ends remote from said support member to hold said cam-like ribs in tight gripping engagement with said drive pin member to hold said drive pin member in the driven position.

References Cited
UNITED STATES PATENTS

| | | | |
|---|---|---|---|
| 2,244,978 | 6/1941 | Tinnerman | 85—36 |
| 2,344,717 | 3/1944 | Mills et al. | 85—82 |
| 2,948,937 | 8/1960 | Rapata | 24—73 |
| 2,956,468 | 10/1960 | Macy | 85—72 |
| 3,164,418 | 1/1965 | Biesecker | 85—5 X |
| 3,169,439 | 2/1965 | Rapata | 85—5 |

FOREIGN PATENTS

| | | |
|---|---|---|
| 1,309,246 | 10/1962 | France. |
| 1,355,787 | 2/1964 | France. |
| 1,025,328 | 4/1966 | Great Britain. |

BOBBY R. GAY, *Primary Examiner.*

ERNEST SIMONSEN, *Assistant Examiner.*

U.S. Cl. X.R.

85—72; 248—73